United States Patent
Jeong et al.

(10) Patent No.: US 8,183,477 B2
(45) Date of Patent: May 22, 2012

(54) SWITCH APPARATUS FOR ADJUSTING POWER SEAT IN VEHICLE

(75) Inventors: Dong Woo Jeong, Hwaseong-si (KR);
 Sang Do Park, Ansan-si (KR); Hak Gyun Kim, Hwaseong-si (KR); Seung Su Han, Seoul (KR); Dong Yeoul Kim, Seoul (KR); Gil Ju Kim, Hwaseong-si (KR); Bong Ku Kim, Hwaseong-si (KR); Yeong Uk Kim, Hwaseong-si (KR); Jun Yeol Heo, Suwon-si (KR); Jong Kweon Pyun, Suwon-si (KR); Myung Ho Lee, Pyeongtaek-si (KR)

(73) Assignees: Hyundai Motor Company, Seoul (KR); Kia Motors Corporation, Seoul (KR); Duckil Industry Co., Ltd., Pyeongtaek-Si (KR)

( * ) Notice: Subject to any disclaimer, the term of this patent is extended or adjusted under 35 U.S.C. 154(b) by 407 days.

(21) Appl. No.: 12/511,521

(22) Filed: Jul. 29, 2009

(65) Prior Publication Data
US 2010/0133082 A1     Jun. 3, 2010

(30) Foreign Application Priority Data

Dec. 1, 2008   (KR) .................. 10-2008-0120703

(51) Int. Cl.
 *H01H 9/26*     (2006.01)
 *H01H 13/72*    (2006.01)
 *H01H 13/76*    (2006.01)

(52) U.S. Cl. ..................................... 200/5 A; 200/50.33
(58) Field of Classification Search ................... 200/5 A
See application file for complete search history.

(56) References Cited

U.S. PATENT DOCUMENTS 5,130,501 A * 7/1992 Maeda ...................... 200/50.33
* cited by examiner

*Primary Examiner* — Renee Luebke
*Assistant Examiner* — Lheiren Mae Caroc
(74) *Attorney, Agent, or Firm* — Morgan, Lewis & Bockius LLP

(57) ABSTRACT

A switch apparatus for adjusting a power seat in a vehicle, may include a body, a plurality of switches installed on the body including a first switch manipulated in a horizontal direction, and a second switch spaced apart from the first switch and manipulated in a vertical direction, and a guide bracket, a first end portion of which is integrally coupled to the first switch and a second end portion of which is placed around the second switch and selectively coupled to the second switch according to a horizontal movement of the first switch, wherein the second switch is movable in the vertical direction while the first switch is in a neutral position, while the first switch is out of the neutral position, and wherein the second end portion of the guide bracket is interfered with the second switch while the second switch is out of a neutral position.

9 Claims, 11 Drawing Sheets

| operation type | 1 | 2 | 3 | 4 | 5 | 6 | 7 | 8 |
|---|---|---|---|---|---|---|---|---|
| operation of 1/2 | | | x | x | O | x | x | x |
| | | | | | x | O | | |
| | | | | | x | x | O | x |
| | | | | | | | x | O |
| operation of 3/4 | x | x | | | x | x | O | x |
| | | | | | | | x | O |
| operation of 5/6 | O | x | x | x | | | x | x |
| | x | O | | | | | | |
| operation of 7/8 | O | x | x | x | x | x | | |
| | x | O | | | | | | |
| | x | x | O | x | | | | |
| | | | x | O | | | | |

SWITCH APPARATUS FOR ADJUSTING POWER SEAT IN VEHICLE

CROSS-REFERENCE TO RELATED APPLICATION

The present application claims priority to Korean Patent Application Number 10-2008-0120703 filed Dec. 1, 2008, the entire contents of which application is incorporated herein for all purpose by this reference.

BACKGROUND OF THE INVENTION

1. Field of the Invention

The present invention relates to a switch apparatus for adjusting a power seat in a vehicle, which limits the simultaneous operation of three modes.

2. Description of Related Art

A power seat is a seat that adjusts the fore and aft movements of the seat or the reclining operation of a seatback using the drive force of a motor. Generally, three or four motors are installed to the power seat. Each motor is electrically connected to a switch apparatus for the adjustment of the power seat.

Meanwhile, the number of the motors corresponds to that of convenient functions which may be provided to the power seat. When several convenient functions, especially three functions are simultaneously executed, a problem arises. That is, the simultaneous execution of the three functions means that three motors are simultaneously operated. In this case, because of overload (maximum 45 A), a fuse (capacity of 30 A) of the interior of the vehicle may be blown.

In order to prevent the above problem, the capacity or number of fuses must be increased or the simultaneous execution of three or more functions must be limited. Conventionally, the simultaneous execution of three functions is limited using a limit switch.

BRIEF SUMMARY OF THE INVENTION

Accordingly, the present invention has been made keeping in mind the above problems occurring in the prior art and an object of the present invention is to provide a switch apparatus for adjusting a power seat in a vehicle, which is constructed to mechanically limit the simultaneous execution of three functions without using an additional fuse or a limit switch.

In an aspect of the present invention, the switch apparatus for adjusting a power seat in a vehicle, may include a body; a plurality of switches installed on the body and configured to be independently manipulated, and including a first switch which is manipulated in a horizontal direction, and a second switch which is spaced apart from the first switch and is manipulated in a vertical direction; and a guide bracket, a first end portion of which is integrally coupled to the first switch and a second end portion of which is placed around the second switch and selectively coupled to the second switch according to a horizontal movement of the first switch, wherein the second switch is movable in the vertical direction while the first switch is in a neutral position, and is interfered with the second end portion of the guide bracket and thus not movable while the first switch is out of the neutral position, and wherein the second end portion of the guide bracket is interfered with the second switch while the second switch is out of a neutral position, thus limiting movement of the first switch.

The second end portion of the guide bracket may include a frame which loosely surrounds the second switch, and comprises a plurality of stoppers which are provided along an inner circumference of the frame in such a way as to protrude toward the second switch, thus limiting a vertical movement of the second switch while the guide bracket moves leftwards or rightwards according to the horizontal movement of the first switch.

The second end portion of the guide bracket may be constructed so that the stoppers interfere with the second switch when the second switch deviates in a vertical direction from the neutral position, thus limiting the horizontal movement of the second switch.

In another aspect of the present invention, the switch apparatus may further include a third switch provided adjacent to the second switch and manipulated in a horizontal direction; and a fourth switch provided adjacent to the third switch and manipulated in a vertical direction.

The first switch may be manipulated by a first knob, and the second to fourth switches may be manipulated by a second knob constructed to manipulate the second to fourth switches simultaneously, wherein the first knob is rotatable leftwards or rightwards around a predetermined rotary point.

The second knob may be constructed so that the second knob does not interfere with the second and fourth switches when the second knob is manipulated leftwards or rightwards, and does not interfere with the third switch when the second knob is manipulated upwards or downwards.

Supports may be provided on the body in such a way as to protrude from opposite sides of the third switch in a horizontal direction thereof, and a partition wall is provided on a back of the second knob on which the supports are placed, the partition wall interfering with the supports so as to prevent the second knob from being simultaneously manipulated in both horizontal and vertical directions.

In further another aspect of the present invention, the first switch may be manipulated by a first knob, and the other switches other than the first switch are manipulated by a second knob constructed to manipulate the other switches other than the first switch simultaneously, wherein the first knob is rotatable leftwards or rightwards around a predetermined rotary point.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
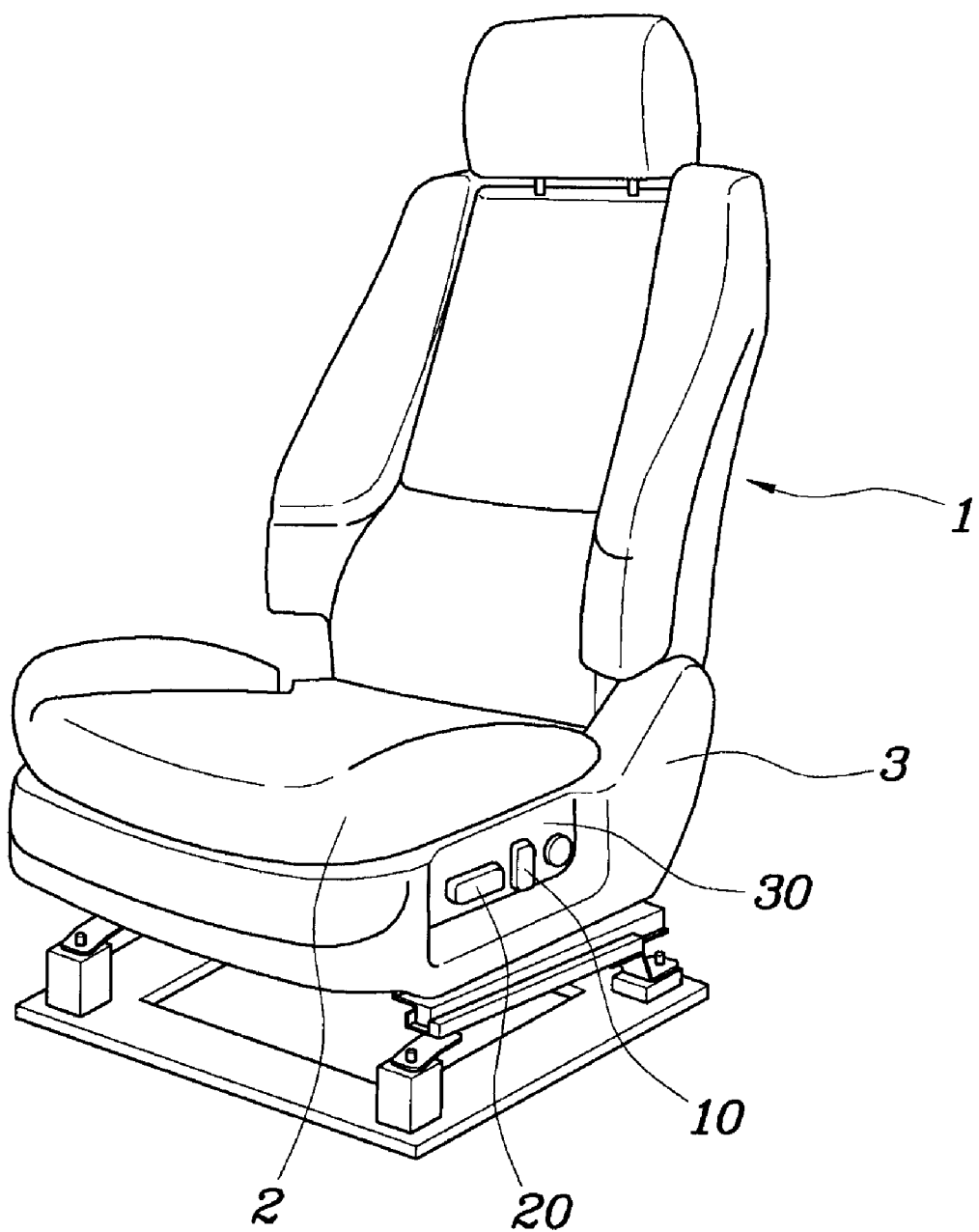
FIG. 1 is a perspective view illustrating an exemplary power seat according to the present invention.

Referring to FIG. 1, the power seat adjusting switch apparatus installed to a seat 1 is provided with two knobs 10 and 20 which are mounted to a side surface of a base 3 under a cushion 2 and are spaced apart from each other. The first knob 10 is used for reclining a seatback, and the second knob 20 is used for sliding the seat 1 forwards and backwards and adjusting the inclination/height of the cushion 2.

Figure 2:
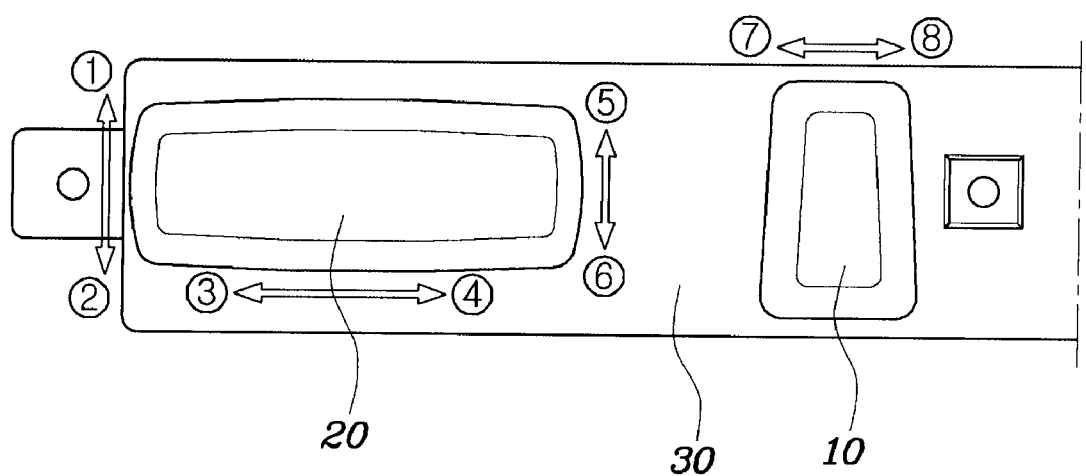
FIG. 2 is a plan view illustrating an exemplary switch apparatus according to the present invention.

Referring to FIG. 2, the first knob 10 is constructed so that its upper end pivots leftwards and rightwards around a rotary point which is provided on the lower end portion of the first knob 10. The second knob 20 is constructed to move upwards ①and ⑤, downwards ② and ⑥, leftwards ③ and rightwards ④. As one example, when the second knob 20 moves leftwards, the seat slides forwards. When the second knob 20 moves in the direction of ①, the front end of the cushion 2 moves upwards. Further, when the second knob 20 moves in the direction of ⑥, the rear end of the cushion moves downwards. As another example, when the second knob 20 is turned strongly around its center counterclockwise in the direction of ② and ⑤, the front end of the cushion 2 moves downwards, and the rear end moves upwards. Further, when the second knob 20 is pushed upwards strongly, both the front and rear ends of the cushion 2 move upwards simultaneously.

Figure 3:
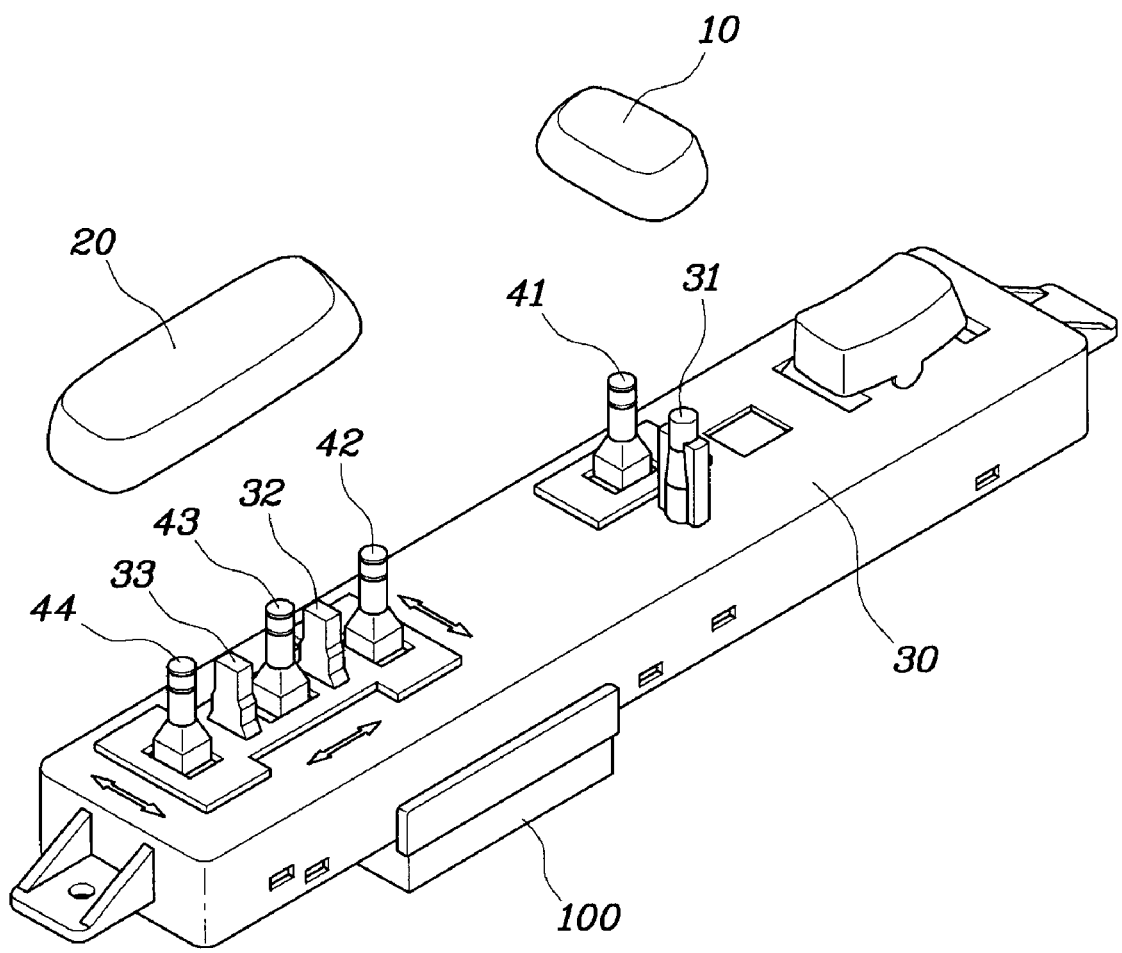
FIG. 3 is a perspective view illustrating the switch apparatus of FIG. 2.

FIG. 3 shows the state in which the body and the knobs 10 and 20 of the switch apparatus are separated from each other. As shown in FIG. 3, a first switch 41 which is manipulated by the first knob 10 and second to fourth switches 42, 43 and 44 which are manipulated by the second knob 20 are provided on the body. The switches 41, 42, 43 and 44 may be manipulated independently The first switch 41 may move leftwards and rightwards so as to recline the seatback, the second switch 42 may move up and down so as to move the rear end of the cushion 2 vertically, the third switch 43 may move leftwards and rightwards so as to slide the seat 1 forwards and backwards, and the fourth switch 44 may move up and down so as to move the front end of the cushion 2 vertically.

Figure 4:
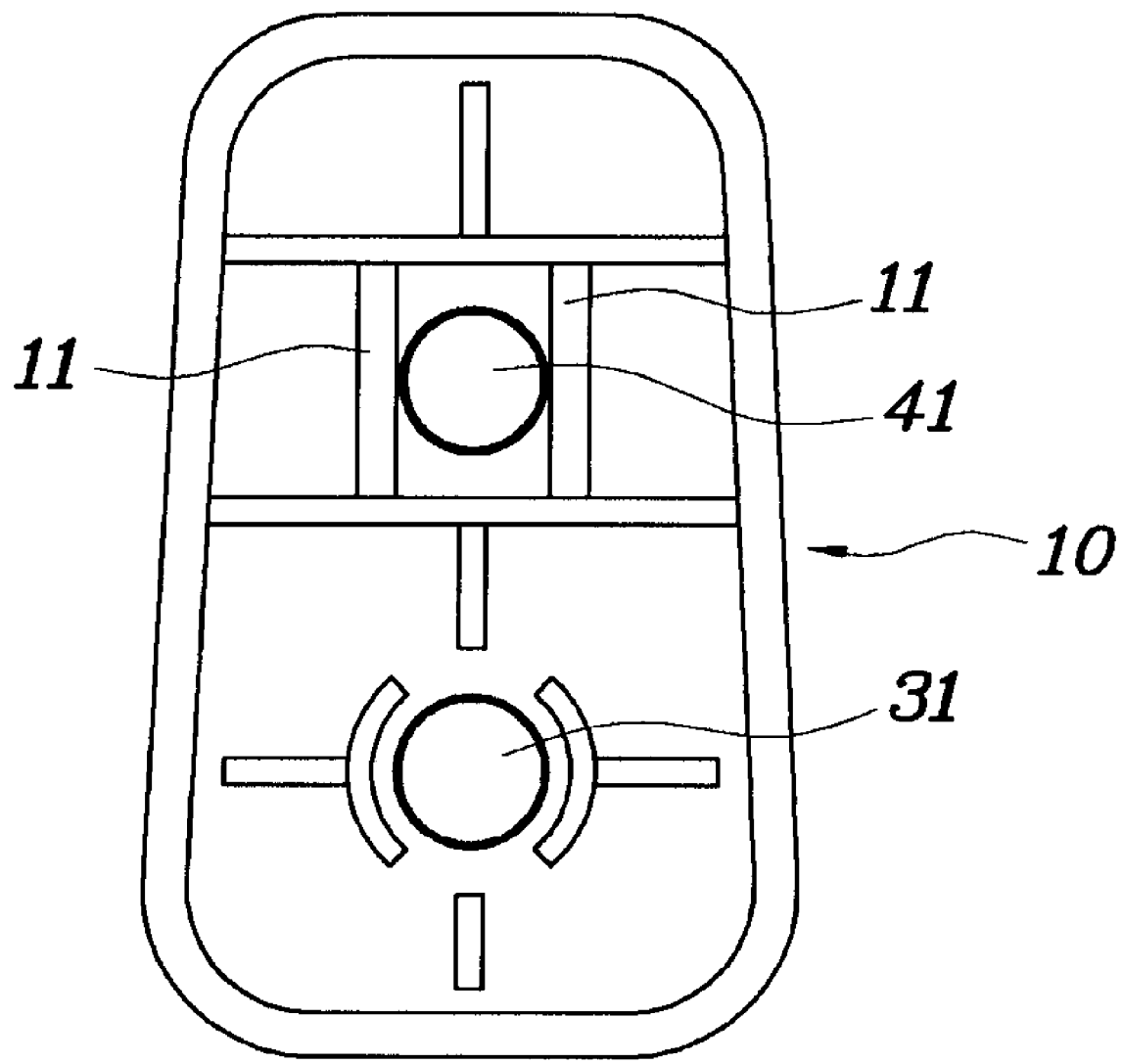
FIG. 4 is a rear view illustrating a first knob of FIG. 3

Referring to FIGS. 3 and 4, three supports 31, 32 and 33 are provided on the upper cover 30 of the body Among the supports 31, 32 and 33, the first support 31 which is provided adjacent to the first switch 41 serves as the rotating shaft for manipulating the first knob 10. Vertical partition walls 11 are provided on the back of the first knob 10 and transmit the rotating force of the first knob 10 to the first switch 41 when the first knob 10 rotates leftwards and rightwards around the first support 31.

Figure 5A:
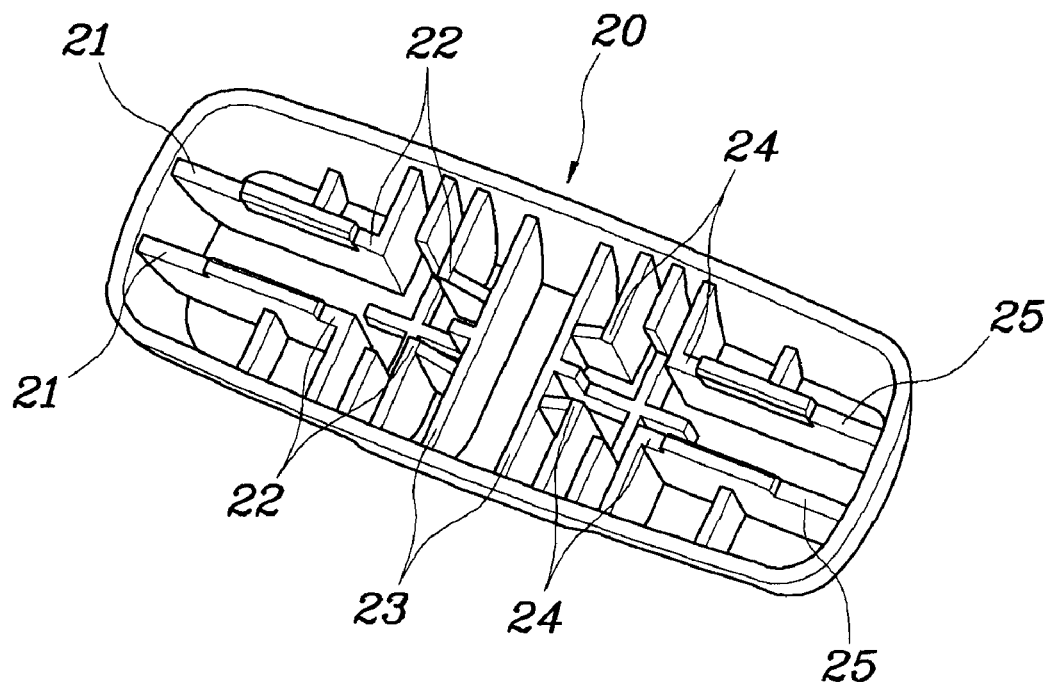
FIGS. 5A and 5B are rear views illustrating a second knob of FIG. 3.
Figure 5B:
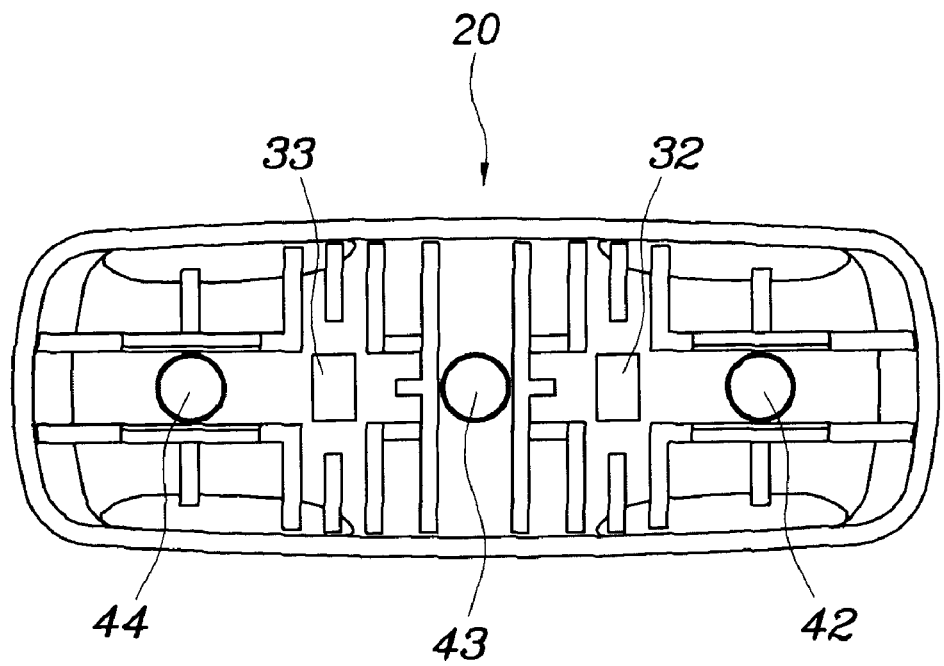

Referring to FIGS. 5A and 5B, first partition walls 21, fifth partition walls 25 and third partition walls 23 are provided on the back of the second knob 20. When the second knob 20 moves up and down, the first and fifth partition walls 21 and 25 function to transmit the moving force to the second and fourth switches 42 and 44. When the second knob 20 moves leftwards and rightwards, the third partition wall 23 functions to transmit the moving force to the third switch 43. When the second knob 20 is manipulated leftwards and rightwards, the first and fifth partition walls 21 and 25 do not interfere with the second and fourth switches 42 and 44. Further, when the second knob 20 is manipulated up and down, the third partition wall 23 does not interfere with the third switch 43. Meanwhile, the second and third supports 32 and 33 which are provided on the opposite sides of the third switch 43 and the second and fourth partition walls 22 and 24 provided on the back of the second knob 20 prevent the second knob 20 from moving in both a horizontal direction and a vertical direction simultaneously For example, in the case where the second knob 20 moves leftwards, the vertical movement of the second knob 20 is prevented by the interference of the second and third supports 32 and 33 with the second and fourth partition walls 22 and 24.

Figure 6:
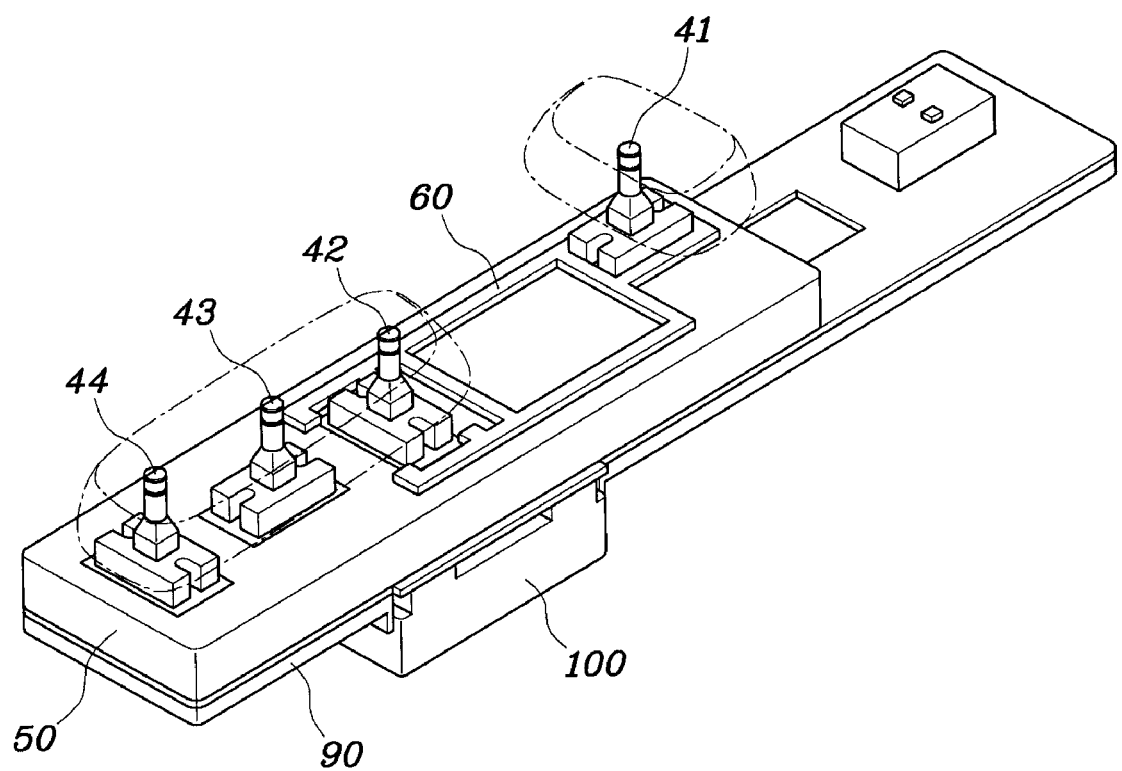
FIG. 6 is a view illustrating the state in which an upper cover is removed from the switch apparatus of FIG. 3.

Referring to FIG. 6, the switches 41, 42, 43 and 44 are mounted on a platform 50 in such a way that they slide in respective manipulating directions. A guide bracket 60 is mounted on the platform 50 so as to prevent any three switches of the switches from being simultaneously manipulated. The guide bracket 60 is provided with a first frame part 61 which is tightly fitted over the first switch 41, a third frame part 63 which is loosely fitted over the second switch 42 to be placed around the second switch 42, and a second frame part 62 which couples the first frame part 61 with the third frame part 63. If the first switch 41 moves leftwards or rightwards, the guide bracket 60 is also moved leftwards or rightwards, and the position of the third frame part 63 relative to the second switch 42 is changed.

Figure 7:
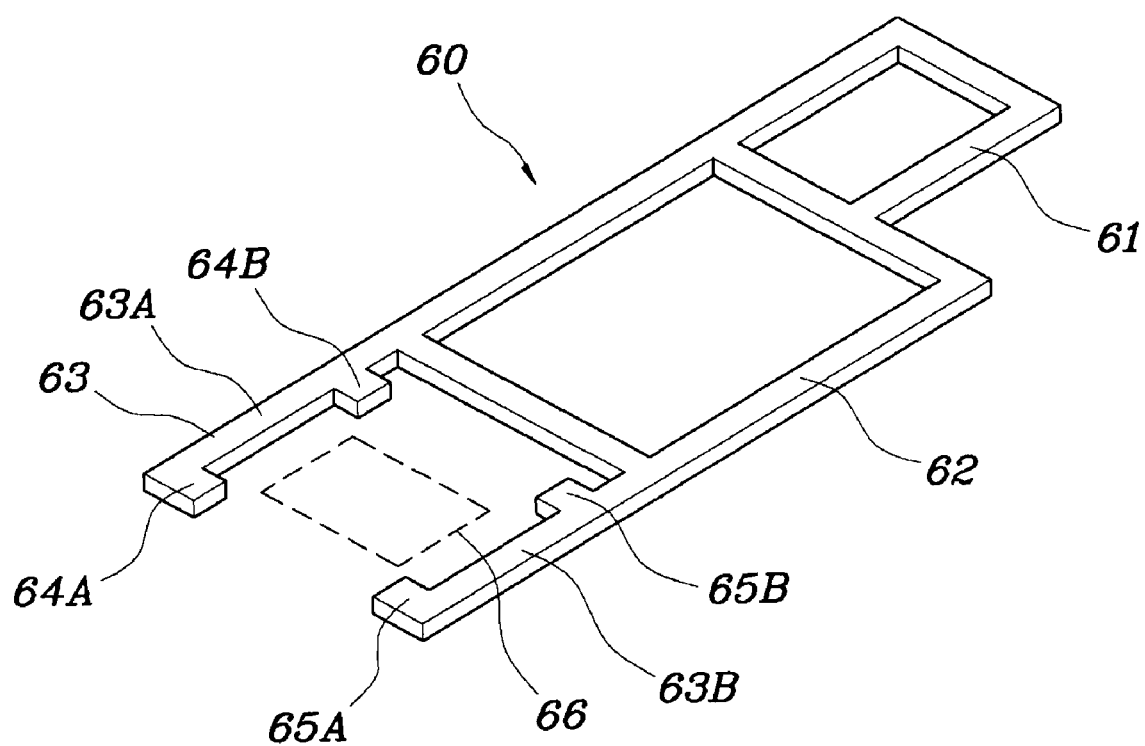
FIG. 7 is a view illustrating a guide bracket of FIG. 6.

Referring to FIGS. 6 and 7, two stoppers 64A and 64B are provided on the upper portion 63A of the third frame part 63 in such a way as to protrude towards the second switch 42, while two stoppers 65A and 65B are provided on the lower portion 63B of the third frame part 63 in such a way as to protrude towards the second switch 42. The second switch 42 may move up and down when the first switch 41 is in a neutral position. However, when the first switch 41 is out of the neutral position, that is, when the first switch 41 moves leftwards or rightwards, so that the guide bracket 60 move leftwards or rightwards and thus the second switch 42 is disposed between the stoppers (e.g., between the stoppers 64A and 65A, or between the stoppers 64B and 65B), the vertical movement of the second switch 42 is limited by the stoppers. Meanwhile, when the second switch 42 is in a neutral position 66, the guide bracket 60 may move leftwards and rightwards. However, when the second switch 42 deviates from the neutral position 66 to be disposed between the stoppers, for example, between the stoppers 64A and 64B or the stoppers 65A and 65B, the guide bracket 60 does not move leftwards and rightwards because of the interference by the stoppers. Consequently, while the first switch 41 is being manipulated, the manipulation of the second switch 42 is limited. In contrast, while the second switch 42 is being manipulated, the manipulation of the first switch 41 is limited.

Figure 8:
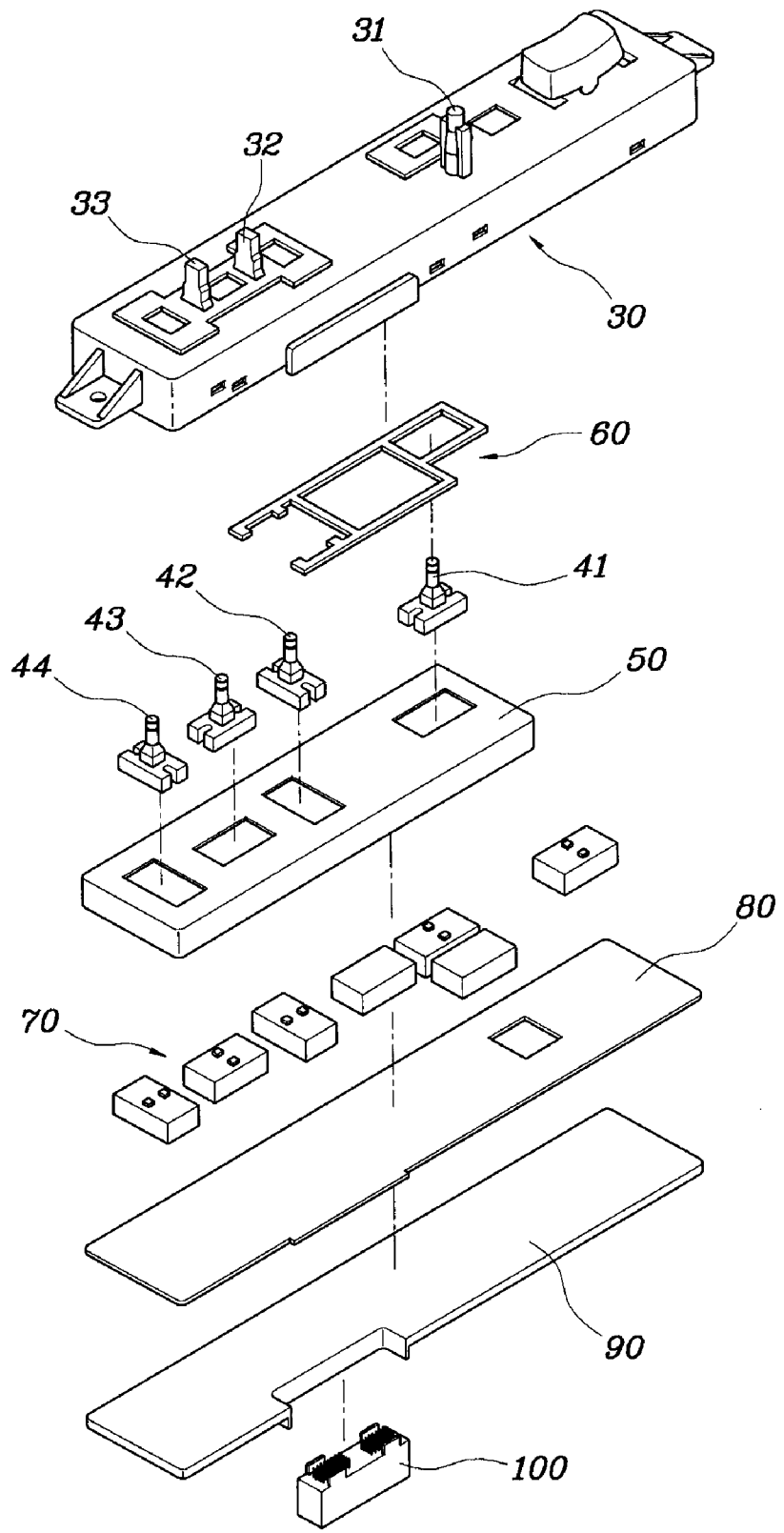
FIG. 8 is an exploded perspective view illustrating the switch apparatus of FIG. 3.

Respective components of the switch apparatus will be described in detail with reference to FIG. 8. That is, the switches 41, 42, 43 and 44 are slidably mounted on the platform 50, and the guide bracket 60 is installed between the first switch 41 and the second switch 42. The upper cover 30 having the supports 31, 32 and 33 covers the platform 50, and a printed circuit board 80 is provided on the bottom of the platform 50, with a switch and a relay 70 mounted on the printed circuit board 80. Meanwhile, the lower portion of the platform 50 is closed by a lower cover 90 which is joined with the upper cover 30. A connector 100 passes through the lower cover 90 to be connected to the printed circuit board 80.

The example of preventing the three switches from being simultaneously manipulated by the guide bracket 60 will be described with reference to FIGS. 9 to 13.

Figure 9:
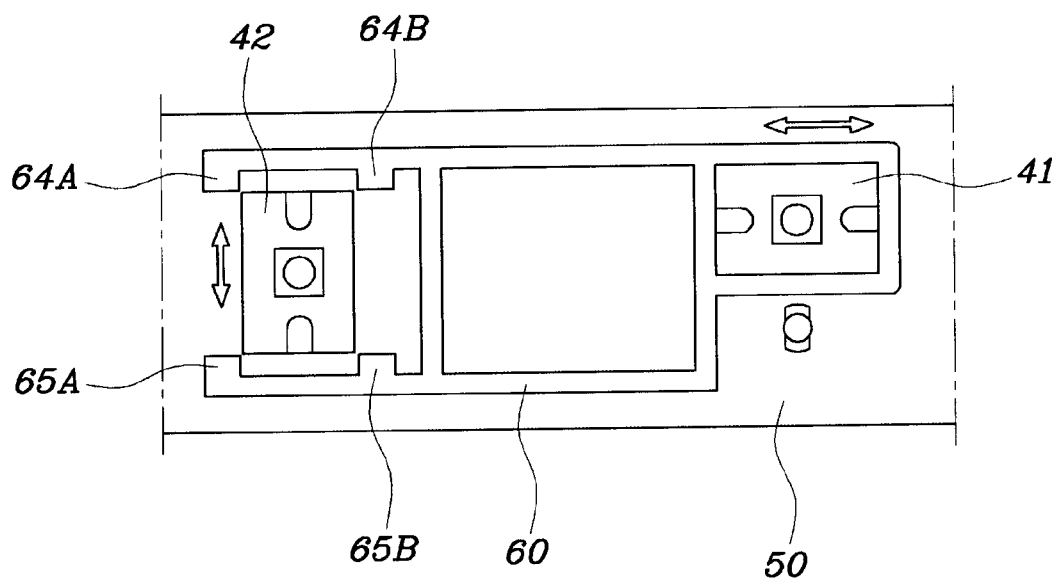
FIGS. 9 to 13 are views illustrating the structure for preventing three convenient functions from being simultaneously executed, in the switch apparatus according to the present invention.
Figure 10:
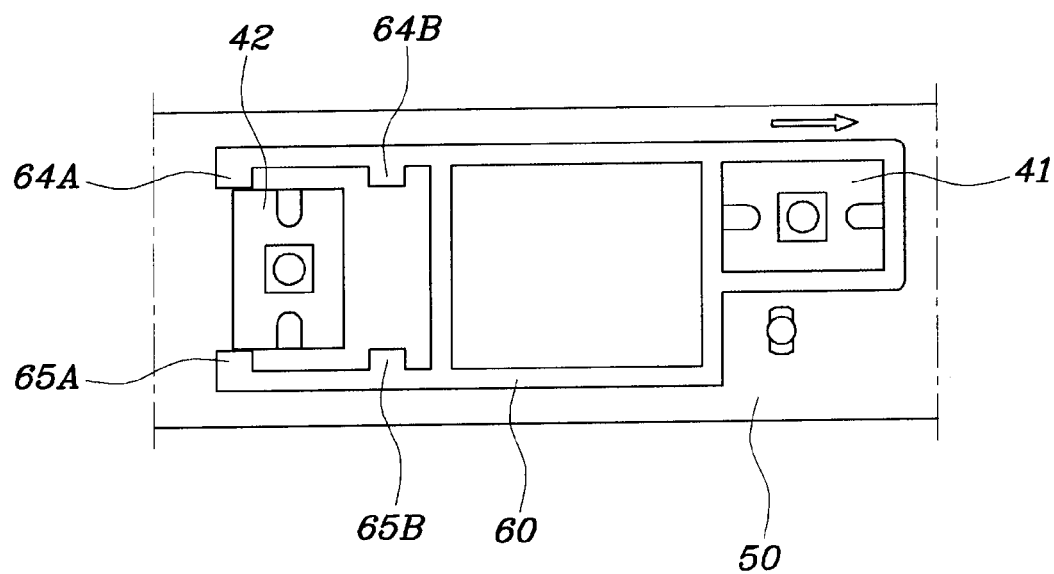
Figure 11:
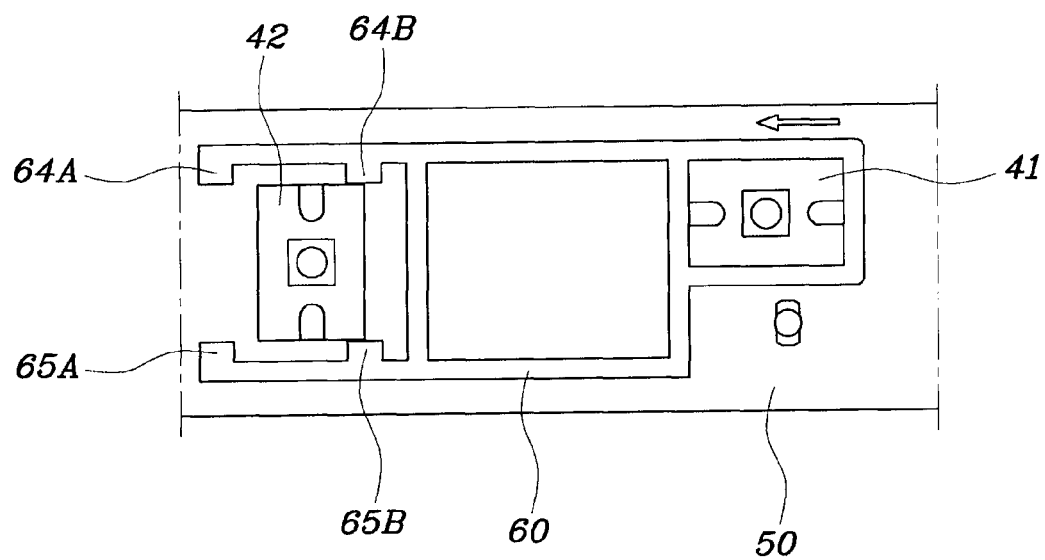
Figure 12:
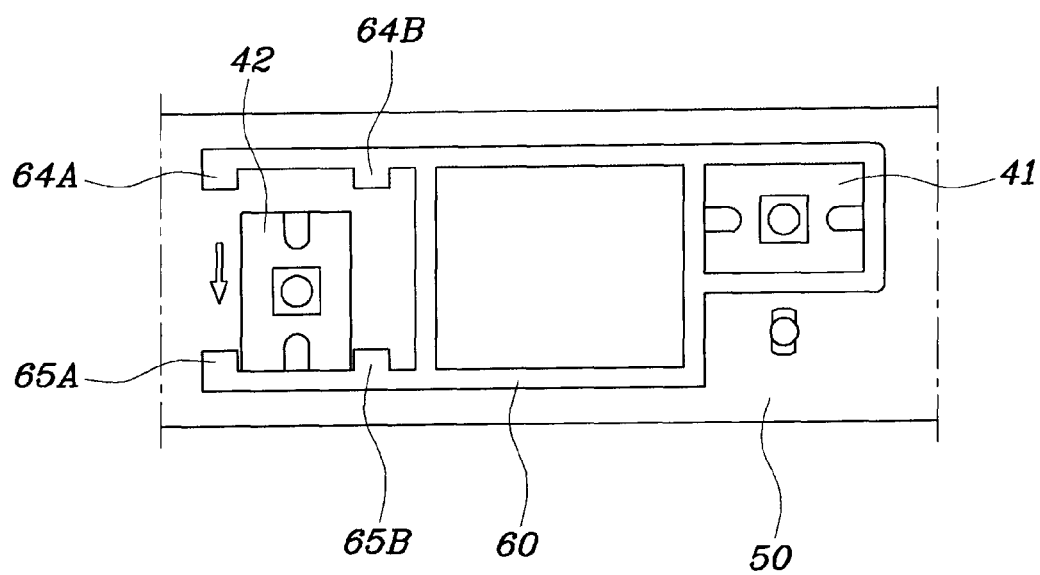
Figures 13, 14:
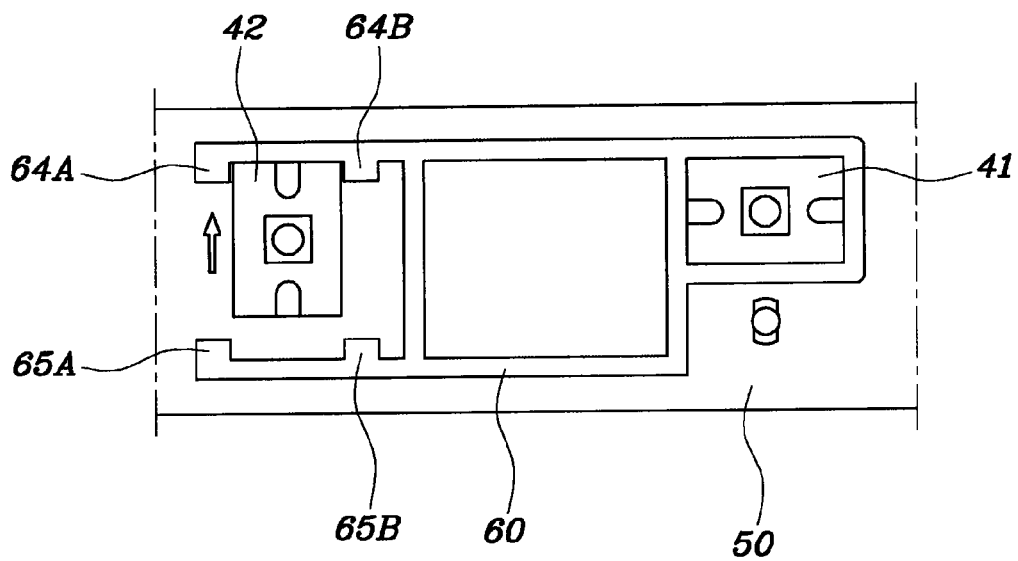
FIG. 14 is a table illustrating the operation of an exemplary switch apparatus according to the present invention.

FIG. 9 illustrates the state in which both the first and second switches 41 and 42 are in the neutral positions. In this state, the first switch 41 may move leftwards or rightwards, and the second switch 42 may move up or down. FIG. 10 illustrates the state in which the first switch 41 has moved rightwards. As the guide bracket 60 moves rightwards along the first switch 41, the vertical movement of the second switch 42 is limited by the stoppers 64A and 65A. FIG. 11 illustrates the state in which as the first switch 41 is manipulated leftwards, the vertical manipulation of the second switch 42 is limited. FIG. 12 illustrates the state in which the second switch 42 has moved downwards. In this state, the horizontal movement of the first switch 41 is limited. FIG. 13 illustrates the state in which as the second switch 42 is manipulated upwards, the horizontal movement of the first switch 41 is limited.

FIG. 14 is a view illustrating the operation of preventing the three switches from being simultaneously manipulated, in all cases including the cases shown in FIGS. 9 to 13. The operation table of FIG. 14 will be described below in brief with reference to FIGS. 2 and 3. That is, when the second knob 20 is manipulated in the direction of ① or ②, it may be manipulated in the direction of ⑤ or ⑥. However, in this case, the second switch 42 is interfered with by the stoppers 64A and 65A or 64B and 65B, so that the manipulation of the first knob 10 is limited. Further, when the second knob 20 is manipulated in the direction of ③ or ④, the vertical manipulation of the second knob 20 is limited by the interference of the second and third supports 32 and 33 with the second and fourth partition walls 22 and 24. Further, when the first knob 10 is manipulated in the direction of ⑦ or ⑧, the vertical manipulation of the second knob 20 is limited by the stoppers and only horizontal manipulation in the direction of ③ or ④ is permitted.

As described above, the present invention provides a switch apparatus for adjusting a power seat in a vehicle, which limits the simultaneous execution of three functions by the manipulation of a knob.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A switch apparatus for adjusting a power seat in a vehicle, comprising:
    a body;
    a plurality of switches installed on the body and configured to be independently manipulated, and including a first switch which is manipulated in a horizontal direction, and a second switch which is spaced apart from the first switch and is manipulated in a vertical direction; and
    a guide bracket, a first end portion of which is integrally coupled to the first switch and a second end portion of which is placed around the second switch and selectively coupled to the second switch according to a horizontal movement of the first switch;
    wherein the second switch is movable in the vertical direction while the first switch is in a neutral position, and is interfered with the second end portion of the guide bracket and thus not movable while the first switch is out of the neutral position;
    wherein the second end portion of the guide bracket is interfered with the second switch while the second switch is out of a neutral position, thus limiting movement of the first switch; and
    wherein the second end portion of the guide bracket comprises a frame which loosely surrounds the second switch, and comprises a plurality of stoppers which are provided along an inner circumference of the frame in such a way as to protrude toward the second switch, thus limiting a vertical movement of the second switch while the guide bracket moves leftwards or rightwards according to the horizontal movement of the first switch.

2. The switch apparatus as set forth in claim 1, wherein the second end portion of the guide bracket is constructed so that the stoppers interfere with the second switch when the second switch deviates in a vertical direction from the neutral position, thus limiting the horizontal movement of the second switch.

3. The switch apparatus as set forth in claim 1, further comprising:
    a third switch provided adjacent to the second switch and manipulated in a horizontal direction; and
    a fourth switch provided adjacent to the third switch and manipulated in a vertical direction.

4. The switch apparatus as set forth in claim 3, wherein the first switch is manipulated by a first knob, and the second to fourth switches are manipulated by a second knob constructed to manipulate the second to fourth switches simultaneously.

5. The switch apparatus as set forth in claim 4, wherein the first knob is rotatable leftwards or rightwards around a predetermined rotary point.

6. The switch apparatus as set forth in claim 4, wherein the second knob is constructed so that the second knob does not interfere with the second and fourth switches when the second knob is manipulated leftwards or rightwards, and does not interfere with the third switch when the second knob is manipulated upwards or downwards.

7. The switch apparatus as set forth in claim 4, wherein supports are provided on the body in such a way as to protrude from opposite sides of the third switch in a horizontal direction thereof, and a partition wall is provided on a back of the second knob on which the supports are placed, the partition wall interfering with the supports so as to prevent the second knob from being simultaneously manipulated in both horizontal and vertical directions.

8. The switch apparatus as set forth in claim 1, wherein the first switch is manipulated by a first knob, and the other switches other than the first switch are manipulated by a second knob constructed to manipulate the other switches other than the first switch simultaneously.

9. The switch apparatus as set forth in claim 8, wherein the first knob is rotatable leftwards or rightwards around a predetermined rotary point.

* * * * *